United States Patent Office 2,890,231
Patented June 9, 1959

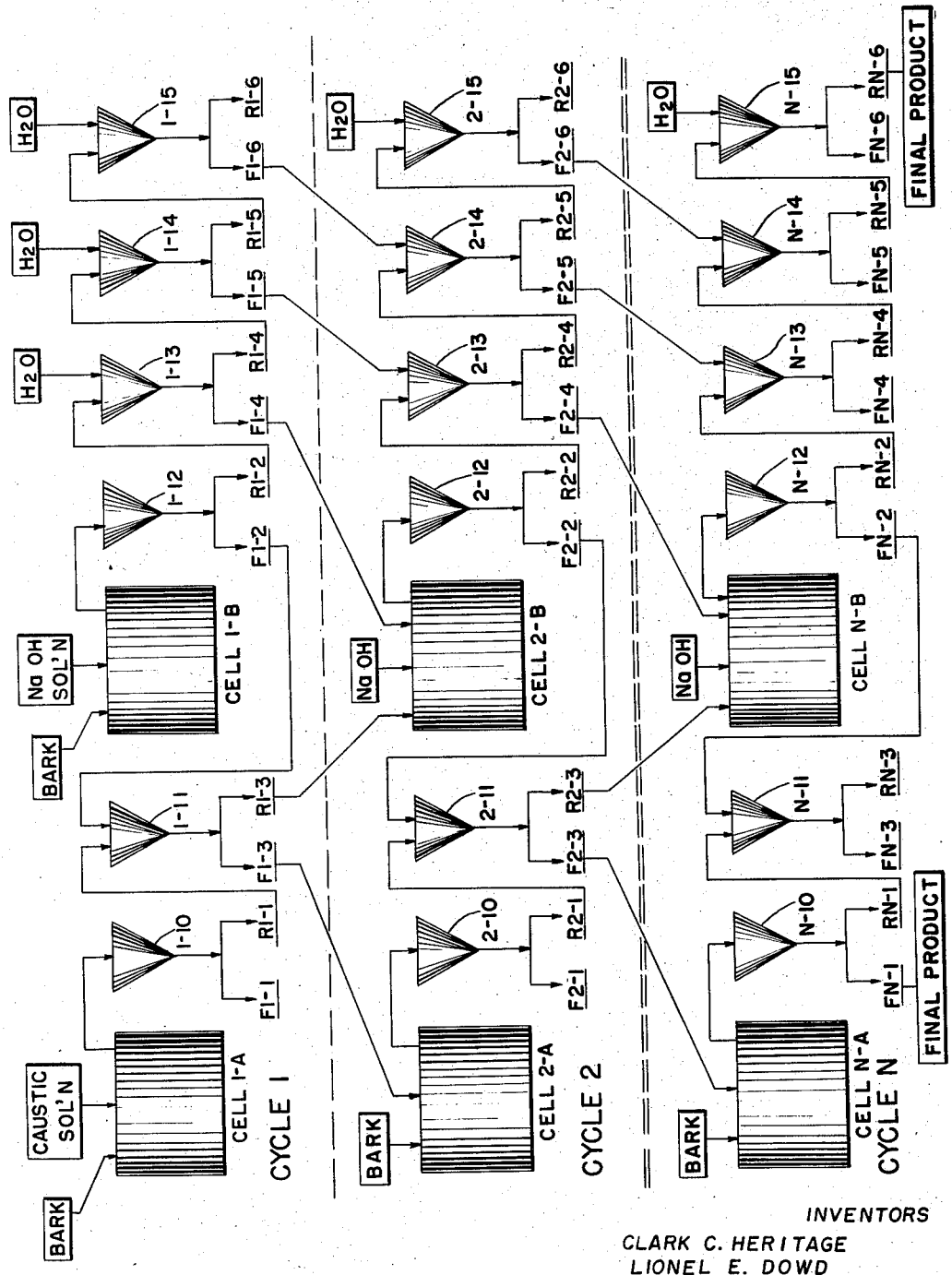

2,890,231

ALKALINE EXTRACTION OF CHEMICAL PRODUCTS FROM BARK

Clark C. Heritage, Tacoma, and Lionel E. Dowd, Longview, Wash., assignors to Weyerhaeuser Timber Company, Tacoma, Wash., a corporation of Washington Application September 20, 1955, Serial No. 535,342

10 Claims. (Cl. 260—412.5)

This invention relates to the recovery of chemical substances from material of vegetable origin and, more particularly, to a process for the extraction and separation of chemicals from the barks of trees.

Material of vegetable origin normally consists of a large number of chemical substances which belong to different chemical families. Because of the divergence of properties of the various components, particular methods of removal of such components from the parent vegetable material may be employed, depending upon the products to be extracted. In view of the fact that tree barks are of limited utility, but nevertheless contain substantial quantities of chemical substances, they constitute a prolific source of valuable extractable materials. In view of the tendency to debark all logs utilized in sawmills and the necessity for removal of bark in plywood and pulp mills prior to peeling or chipping, there is created a by-product in the form of the removed bark available in substantial quantities at all types of log processing plants. Particularly in the case of Douglas fir, the bark represents up to one-sixth of the volume of the log, and although there is a substantial market for some physically separated components of this bark, the principal use of this volume by-product is as fuel, a use for which it is poorly adapted. This bark contains approximately 35% of lignocellulose material and approximately 65% of substances which may be extracted from the bark by solubilizing methods.

One extraction method utilizing water at elevated temperature as the extracting medium removes from ground Douglas fir bark approximately 10% of the dry weight of the original bark as extract. This process is described in the application of Clark C. Heritage, Serial No. 463,791, filed October 21, 1954. The water extract of that process comprises dihydroquercetin, a mixture of phenolic substances and water-soluble non-phenolic material containing some carbohydrate-like products. Processes have been suggested for the recovery of further amounts of particular extractable components, some of which may not be extracted by the aqueous extraction method. Such processes utilize selective solvents for the dihydroquercetin, waxes, phenolics, and phlobaphenes in a sequential application of the selective solvents comprising a complex system of extractions. One such process is described in U.S. Patent 2,662,893, issued to E. F. Kurth on December 15, 1953. This patented process utilizes expensive and hazardous solvents such as aliphatic hydrocarbon solvents, aromatic hydrocarbon solvents, halogenated aliphatic hydrocarbon solvents, ethers and alcohols which require particular methods of handling and are difficult of recovery.

It has now been found that the extractable chemicals of tree barks may be recovered and useful products obtained in an economic, non-hazardous and efficacious manner by an extraction procedure which comprises exhaustively extracting the bark material with an aqueous alkaline reagent which yields a lignocellulose residue and an aqueous solution followed by fractionation of the solution extract by simple acidification. If it is desired to recover the dihydroquercetin from the bark, a water extraction in accordance with the process mentioned above should precede the caustic extraction, since dihydroquercetin tends to be destroyed under hot alkaline conditions. Either previously unextracted bark or bark which has been submitted to an aqueous extraction or extraction by other selective solvent may therefore be employed as the starting material in this process.

The process of this invention results in the production of three useful products which are a high density particulate lignocellulose material which is useful as a component for moldable resin compounds; a mixture of high fatty acid waxes and acid phenolics, the wax components of which may be utilized in the manufacture of floor waxes, fabric coating and moisture proofing agents, rubber antioxidants, pigment vehicles for transfer paper, and in the form of the lithium salt of the wax as a lube oil detergent, and the phenolic components of which may be employed as adhesive laminates for paper, and in the preparation of drilling muds for oil wells; and a solution of acid soluble organics which may be utilized as starting materials for the production of carbohydrate products.

In carrying out the process of this application, the bark material to be extracted is first reduced to a comminuted form in order to increase the specific surface and decrease the linear distances between the particle surfaces and the interior of the particles, thus enhancing the speed of extraction. Preferably, the bark should have a moisture content of from 40-60% by weight, and be reduced in a hammermill or other similar comminuting device until the particle size is such that a major portion of the particles will pass an 8-mesh screen but be retained in an 80-mesh screen (U.S. Sieve Series). The alkaline extraction of the freshly ground bark may be carried out by a single batch procedure, by a sequence of batch treatments, or, preferably, by a continuous procedure wherein there is a relative motion of the solid and extracting liquid in either a single or plurality of treating cells followed by phase separation into a residue phase and extract phase after the extraction of each treating cell has been completed.

Although the conditions of extraction, such as consistency or concentration of the solid in the liquid phase, amount of alkaline solvent, temperature during extraction, contact time (length of time the average solid particle is in contact with an extracting medium), and retention time (length of time a statistically average volume element of the extraction medium is in contact with the solid), may be varied according to the material being extracted and the products desired, it has been found that optimum results are obtained by observance of close control of predetermined conditions. In the case of Douglas fir bark, for example, the consistency of the bark in an aqueous caustic extraction solution should in the range below 25%, preferably in the range between about 10% and about 20%. The caustic usage should be in the range between about 16% and 20% for batchwise extraction, the percentages being based on the dry weight of the material being extracted, and in the range between about 10% and 14% when countercurrent extraction is used. The temperature should be maintained at or near the boiling point of water, and the duration of treatment in the range of between 15 minutes and 180 minutes, whether the extraction procedure employed is a batch process, a continuous process, or a continuous countercurrent process. Any suitable method of phase separation may be employed, such as filtration by gravity, pressure, or vacuum, or centrifuging, and complete washing of the separated solid after phase separation should be observed in order to remove sorbed and occluded material.

The alkaline extraction medium for this process should be one which will not react with the material being extracted, or any of its components, to yield a precipitated substance, although it is permissible that some reaction products may be colloidally dispersed. For example, certain of the products removed from Douglas fir bark by sodium hydroxide solution, which is a preferred alkaline solvent, are colloidally dispersed, rather than obtained in true solution, and appear as a liquid phase product, while other components which may be water-soluble or alkali-soluble are solubilized in the aqueous alkaline extract, and thus extracted by the solution as the extraction proceeds. Aqueous solutions of soluble alkali metal and ammonium compounds are preferred as the extraction media. Specific alkaline reagents which have been found suitable include sodium hydroxide, potassium hydroxide, sodium carbonate, sodium bicarbonate, ammonium carbonate, and borax. In the extraction of comminuted Douglas fir bark using the batch extraction method, on the basis of 20% consistency and 20% usage of the alkaline reagent, carrying out the treatment at the temperature of boiling water for 2 hours, the percentage of alkaline extractable materials recovered by these reagents is as follows:

| Alkaline reagent: | Percent by weight extracted |
|---|---|
| Sodium hydroxide | 60.0 |
| Potassium hydroxide | 48.4 |
| Sodium carbonate | 44.0 |
| Sodium bicarbonate | 41.6 |
| Ammonium carbonate | 33.4 |
| Borax | 24.8 |

In carrying out the alkaline extraction the amount of alkaline reagent employed depends upon the extent of extraction desired. The ion concentration of the extraction solution can be anywhere in the alkaline range. For optimum results, if utilization of the complete extraction potential of the alkaline reagent employed is desired, the amount of alkaline extracting agent employed should be sufficient to produce a pH of the solution in excess of 11 and preferably in the order of 12 where the extraction is carried out on a batchwise or continuous single cell basis. Where a counter-current multiple cell extraction procedure is employed, optimum results may be obtained by maintaining a pH in the range of 8 to 11 at the end of the system where the entering solid is rich in extractable components and a pH greater than 11 and preferably in the order of 12 at the end of the system where the entering solid is poor in extractable components.

In order to fractionate the alkaline extracted bark components in a soluble-rich extraction liquid withdrawn from the extraction system, a quantity of acid sufficient to adjust the pH level to a range of between 1.5 and 5.5 is added. Any acidic precipitating agent which is soluble in water and which has a sufficiently high hydrogen ion concentration to provide the desired precipitation may be employed. However, the amount and composition of the alkaline extracted material precipitated from the alkaline extraction solution may vary depending upon the particular acid selected. It has been found that for a given alkaline extract of Douglas fir bark, sulfuric acid precipitates more of the extracted material than acetic acid. Acetic acid, in turn, precipitates more material than does gaseous sulfur dioxide bubbled into the extract solution. It has also been found that the ratio of extracted phenolic substance to wax substance is greatest with sulfuric acid and least with sulfur dioxide. This difference of behavior of the specific acids employed may be attributed to differences in pH level produced, to difference in behavior as dehydrating agents, to difference in flocculating potential for hydrophilic colloidal material, and to other contributing factors.

The addition of sodium sulfate to the system reduces the amount of acid required to cause precipitation of a given amount of organics. Thus, the concentration of sodium sulfate at the time of acidification affects precipitation. The neutralization of caustic extract with sulfuric acid produces sodium sulfate down to a pH of 3.5 and sodium acid sulfate starts to form below that point. The amount of caustic used in the extraction controls the amount of sodium sulfate present during acidification. The concentration of the extract also affects the concentration of sodium sulfate.

The choice of the acidification agent depends upon the composition of the product desired, but the preferred agent is a strong mineral acid which will precipitate substantially completely all of the acid-insoluble phenolics and wax-like components. Preferably, sufficient strong acid is added to produce a pH level of about 2.5 before removal of the precipitate. The temperature at which the acid is added to the extraction solution is not material, but, preferably, the acid is added slowly while stirring the extract and maintaining the temperature at or near the boiling point of water and at atmospheric pressure. Generally, the amount of wax obtained in the precipitate increases with an increase in the temperature of acidification.

In its preferred embodiment the solid phase remaining after phase separation and washing should be substantially free of all alkaline extractable materials and the acid insoluble precipitate obtained by acidification of the extraction solution should contain all of the acid insoluble phenolics and acid insoluble wax-like components. Where Douglas fir bark or one of its fractions is employed as the material to be extracted, the extraction residue will comprise substantially entirely sclerenchyma tissue, together with a small amount of cellulosic skeletal material remaining from the cell walls of the cork component. The acid-insoluble product of the acidification step will comprise acid-insoluble phenolic and wax-like substances, and the acid-soluble product will comprise acid-soluble phenolics, carbohydrate materials, cellulose degradation products, inorganic ions and other aqueous acid-soluble substances. Where the alkaline extraction is not complete the residue will not be extractive-free and the products isolated from the extract by acidification will be in different proportions than if the extraction were complete.

In the preferred countercurrent method of extraction utilizing a minimum of two extraction cells in series, each of which discharges to a washing phase separator, economy in the quantity of alkaline reagent required may be effected. This results from the fact that the extract solution obtained from a preceding extraction cell, even though it may contain no free alkali, is a solvent for the alkaline extractable bark components available for bark extraction in a succeeding cell of the system. Experiment has shown that when sodium hydroxide is used to extract Douglas fir bark completely on a batchwise basis approximately 20 grams of caustic solid is required for each 100 grams of dry bark, whereas when the extraction is carried out in a countercurrent system utilizing two or more extraction cells the amount of caustic required to produce complete extraction is in the order of 10–12 grams per 100 grams of dry bark solid. A further economy is effected by this method due to the fact that less acid is required in the acidification step. It has also been shown that when the caustic extraction and acid precipitation sequence has been carried out by the preferred countercurrent procedure a greater yield of wax-like products is obtained than is possible by direct treatment of the raw material with specific solvents, or by the same amount of caustic used in a batch extraction. The mechanism of this increased yield of the wax components is not understood, but it is assumed that the alkaline treatment produces a cleavage of complex molecules to produce smaller molecules having wax-like properties.

EXAMPLES

The following examples serve to illustrate the process of this invention in its more specific embodiments, it being understood that the invention is not limited to such specific embodiments or to any of the specific conditions set forth, and is subject only to the limitations of the subscribed claims.

Example I.—Solubility of Douglas fir bark and its fractions in caustic

Douglas fir bark comprises three basic fractions which differ from each other in known physical properties and in chemical composition. These fractions are a cork-like fraction, a sclerenchyma tissue, and a parenchyma tissue fraction comprised typically in the proportion of 25% cork, 30% sclerenchyma tissue, and 45% parenchyma tissue. These components may be separated as substantially uniform fractions, each uncontaminated by the presence of other components, by known means. In order to determine the caustic solubility of Douglas fir bark and its fractions, 10-gram samples of finely ground whole bark and each of its fractions were separately placed in 90 grams of aqueous caustic solution containing 3 grams of sodium hydroxide and refluxed at atmospheric pressure for one hour. The slurries were then filtered through a tared, sintered glass filter and the residues were washed thoroughly with water to remove any sorbed or occluded material. The residues were then dried and weighed. The results of this test are as follows:

Sample: Percent extracted
Whole bark _____ 65
Cork _____ 88
Sclerenchyma _____ 18
Parenchyma _____ 85

*Effect of temperature on caustic extraction.*—In order to determine the effect of temperature on the caustic extraction of Douglas fir bark, finely comminuted Douglas fir bark was extracted in the cold with sodium hydroxide solution in the amount of 15% based on the dry weight of the bark. After continued stirring for one hour, phase separation was effected, and it was found that the residue represented 71% of the original bark and contained 40.8% of the original ether soluble components. This residue was then re-extracted with sodium hydroxide solution supplying 15% sodium hydroxide based on the dry weight of the residue with stirring for one hour at 100° C. Phase separation was again effected and it was found that the residue represented 37.8% of the original bark and contained 5.9% of the original ether soluble components.

*Effect of different alkaline reagents.*—In order to determine the effect of using different alkaline reagents in the alkaline extraction, samples of finely comminuted Douglas fir bark were extracted under reflux conditions for 2 hours at 20% consistency, using 20% of the alkaline reagent based upon the dry weight of the bark. After digestion at 100° C. the mixtures were filtered and the residue washed, dried and ether extracted. The initial bark mixture contained 12.5% ether solubles. The following table shows the results obtained:

TABLE I

| Alkaline Extractant | Analysis of Residue | | Analysis of Extract | |
|---|---|---|---|---|
| | Percent Yield | Percent Ether Solubles | Percent Yield | Percent Ether Solubles |
| Sodium Carbonate | 56.0 | 4.1 | 44.0 | 8.4 |
| Sodium Bicarbonate | 58.4 | 3.7 | 41.6 | 8.8 |
| Ammonium Carbonate | 66.6 | 4.3 | 33.4 | 8.2 |
| Borax | 75.2 | 4.8 | 24.8 | 7.7 |
| Potassium Hydroxide | 51.6 | 2.7 | 48.4 | 9.8 |
| Sodium Hydroxide | 40.0 | 0.1 | 60.0 | 12.4 |

ACID PRECIPITATION AGENTS

The effectiveness of various agents for acidification of the alkaline extract was determined by extracting Douglas fir bark in highly comminuted form batchwise with sodium hydroxide and acidifying aliquots of the extract with selected acids and acid materials at varying temperatures. Sulfuric, hydrochloric and acetic acids, sulfur dioxide, carbon dioxide, sodium sulfite and sodium bisulfite were tested. The strong mineral acids represented by sulfuric and hydrochloric acids precipitated maximum amounts of acid insolubles. The acetic acid and sulfur dioxide precipitated the acid insolubles in smaller quantities than the strong mineral acids, while carbon dioxide, sodium sulfite and sodium bisulfite were ineffective as acid precipitants. In the case of sulfur dioxide the ratio of ether-solubles to ether-insolubles was significantly greater in the acid insoluble fraction than in the case of the stronger mineral acids. For proper precipitation of the acid insolubles from the alkaline extraction solution, it is necessary to develop an acid potential in the range of pH 1.5 to pH 5.5.

Example II

The caustic solubility and extraction potential of caustic for the barks of various types of trees were tested by making an aqueous slurry of 10% consistency of comminuted bark, adding sodium hydroxide in an amount equivalent to 20% of the dry weight of the bark and cooking at 100° C. for one hour. The residues were washed three times with water at 50° C., centrifuged after each washing and the centrifugates combined. The extracts were acidified to pH 2 with sulfuric acid and the organic content determined for both the acid solubles and insoluble fractions. The results of these tests are given in the following table:

TABLE II

| Property | Alder Bark | White Fir Bark | Western Hemlock Bark | Douglas Fir Bark |
|---|---|---|---|---|
| Solubility in 20% NaOH | 34.1 | 36.8 | 50.8 | 40. |
| Percent Acid Insolubles, Original Bark Basis | 11.9 | 18.0 | 27.9 | 23.0 |
| Percent Acid Solubles, Original Bark Basis | 22.2 | 18.8 | 22.9 | 17.2 |
| Percent Acid Insolubles, Extract Basis | 34.9 | 49.0 | 55.0 | 57.2 |
| Percent Acid Solubles, Extract Basis | 65.1 | 51.0 | 45.0 | 42.8 |

Example III

Finely ground Douglas fir bark was extracted for one hour under reflux conditions at 23% consistency and 15% usage of sodium hydroxide based on the dry weight of the bark. The temperature was maintained at 100° C. The slurry of the bark and sodium hydroxide extracting solution was then filtered and the residue thoroughly washed. The filtrate was acidified to pH 2.0 by addition of hydrochloric acid. A precipitate formed which was coagulated by heating. This mixture of solution and acid precipitate was then filtered and the precipitate thoroughly washed.

All of the fractions obtained by the caustic extraction and acid treatment were analyzed for the presence of ether solubles by addition of diethyl ether which is a solvent for the wax components, any persisting chroman derivatives such as dihydroquercetin, and other constituents. The results of these analyses are as follows:

The percentages of ether solubles and ether insolubles for extracted fractions are on the basis of the original bark sample.

TABLE III

| Process Fraction | Percent Ether Soluble | Percent Ether Insoluble |
| --- | --- | --- |
| Original Bark | 8.0 | 92.0 |
| Caustic Extracted Bark | 0.5 | 43.2 |
| Caustic Extract | 7.5 | 48.8 |
| Acid Insoluble | 6.0 | 32.7 |
| Acid Soluble | 1.4 | 16.1 |

In this example the extract of the whole Douglas fir bark contained 93.7% of the ether soluble content of the original bark and 53.0% of the ether insoluble material of the original bark. The residue of the caustic extracted bark contained a very high proportion of sclerenchyma tissue in the form of dense granular or spindle-shaped lignocellulose particles mixed with a minor proportion of the cellulosic skeletons of individual cork cells. The caustic extract was a dark-colored liquid. The ether solubles comprised wax-like components, principally fatty acids, fatty alcohols and esters of the fatty acids and fatty alcohols, with some phenolic substances soluble in ether. The dihydroquercetin content of the original bark was transformed by the caustic extraction substantially completely into other products. Upon acidification of the caustic extract the ether solubles were divided between the precipitate and the filtrate in the ratio of 80% to 20%. The acid addition also resulted in the precipitation of 67% of the ether insoluble materials as a dark-colored, gelatinous product consisting principally of phenols. The remaining 33% of the ether insolubles in the solution after acidification contained carbohydrates, low molecular weight phenols and other organics.

*Example IV*

Whole ground Douglas fir bark was extracted with sodium hydroxide solution using the following conditions:

Caustic usage (based on the dry weight of the bark _____percent__ 20
Consistency _____do____ 15
Temperature _____° C__ 100
Extraction time _____minutes__ 20

The extraction slurry was filtered and the residue washed with water. The extract was acidified to pH 1.5 and the resulting precipitate removed by filtration. The wax content was measured by carbon tetrachloride solubility. 9.3% wax on the original bark basis was found in the products after caustic extraction compared with 5.5% wax in the original bark, representing an increase in the wax content of 69%.

*Example V.—Extraction of Douglas fir bark fiber*

A mechanically separated Douglas fir bark fraction which was rich in sclerenchyma tissue or bark fiber was extracted by a batch procedure under reflux conditions at the boiling point using 13% of sodium hydroxide based on the dry weight of the bark as the extracting medium. Extraction was continued for a period of one hour. The mixture of bark residue and extract was filtered and washed thoroughly with water to remove all sorbed and occluded material from the residue. The washings were combined with the filtrate and the latter acidified to pH 1.5 by slowly adding sulfuric acid while maintaining the solution at its boiling point. A brown, flocculent precipitate comprising a high acid phenolic content resulted and was filtered off. The bark residue resulting from the alkaline extraction consisted substantially entirely of needle-shaped bark fibers with a small quantity of cork cell skeletons and amorphous material.

*Example VI.—Extraction of Douglas fir cork component*

Douglas fir cork separated mechanically from comminuted whole Douglas fir bark was extracted with sodium hydroxide using different amounts of sodium hydroxide at 15% consistency and continuing the extraction on a batchwise basis at 100° C. for one hour. Solubility of this cork fraction at the different caustic usages was as follows:

| Percent caustic usage: | Percent solubility (original cork basis) |
| --- | --- |
| 0 | 16.6 |
| 5 | 28.8 |
| 10 | 38.5 |
| 15 | 65.2 |
| 20 | 77.0 |
| 25 | 81.1 |

The Douglas fir cork extract obtained by treating the cork fraction at 15% consistency for one hour at 100° C. with the caustic at 20% usage was phase separated and treated with acetic acid to pH 4.5 while maintaining the extract solution at boiling temperature. A precipitate formed constituting 51.7% of the dissolved material in the extract solution, the precipitate comprising a mixture of acid phenolics and wax. The precipitate was treated with benzene in which 48.1% of the precipitated material dissolved.

*Example VII.—Continuous countercurrent extraction*

This modification of the extraction method can best be carried out in an arrangement of apparatus such as is shown in diagrammatic fashion in the accompanying drawing. It comprises a number of cycles of operation, three of which are shown in the drawing, designated as Cycle No. 1, Cycle No. 2 and Cycle N. Each cycle comprises in sequence an extraction cell A, a filter 10, a washing filter 11, an extraction cell B, a filter 12, and three washing filters 13, 14 and 15 in series. In the drawing the extract products are designated by ovals and the residue products by rectangles. Cycles 1 and 2 represent start up extractions of which there may be as many as are necessary to establish an equilibrium. Cycle N represents the first equilibrium cycle. This cycle is the first one at which all extractions have the same composition from cycle to cycle.

The process is started in operation by adding ground Douglas fir bark to cells 1-A and 1-B of Cycle 1. Sodium hydroxide is added to cell 1-A in quantity such that the caustic usage is 6% of the oven dry weight of the bark, and the bark is added in such quantity that the consistency in this cell is maintained at 12.5%. Sodium hydroxide is also added to cell 1-B in a quantity sufficient to provide a caustic usage of 18%, and the bark in such amount as to maintain the consistency of 10% in this cell, both percentages being based on the oven dry weight of the bark. These mixtures are agitated slowly at boiling temperature for 30 minutes. Evaporation losses are made up by addition of water.

The slurry of bark and caustic from cell 1-A is filtered to yield a first residue R1-1 and a first fiiltrate F1-1. The latter is evaluated for composition. The slurry of bark and caustic from cell 1-B is filtered through filter 1-12 to yield a second residue R1-2 and a second filtrate F1-2. The first residue R1-1 is washed with the second filtrate F1-2 at 100° C. This step yields a third residue R1-3 and a third filtrate F1-3. The second residue R1-2 is washed for a period of 5 minutes and filtered at the first washing filter 1-13 to yield a fourth residue R1-4 and a fourth filtrate F1-4 which latter is designated as the "strong wash." The fourth residue R1-4 is then re-washed with water equivalent to 5.6 times the weight of the bark fed to cell 1-A at boiling temperature for 5 minutes and filtered through the second washing filter 1-14 to yield a fifth residue R1-5 and a fifth filtrate F1-5, which latter is designated as the "medium wash liquor." The fifth residue R1-5 is again re-washed with boiling water equivalent to 5.9 times the weight of the bark fed to cell 1-A for five minutes and filtered at filter 1-15 to yield a sixth residue R1–6 and a sixth filtrate F1–6 which is designated as the "weak wash liquor."

In Cycle 2 additional ground Douglas fir bark is introduced to cell 2–A with filtrate F1–3 from Cycle 1. This mixture is maintained at a consistency of 12.5% on the basis of the oven dry weight of the bark. It is agitated slowly for 30 minutes at 100° C., after which it is filtered to yield a residue R2–1 and a filtrate F2–1. Residue R1–3 from the first cycle is introduced into cell 2–B of the second cycle, together with filtrate F1–4, the "strong wash" from the first cycle. An additional amount of sodium hydroxide equivalent to 12% of the weight of the bark in cell 2–A is also added at cell 2–B. The consistency of this latter cell is maintained at 10%. The mixture in cell 2–B is agitated slowly for 30 minutes at 100° C. and filtered through filter 2–12 to yield a residue R2–2 and a filtrate F2–2 which latter is used to wash residue R2–1 at filter 2–11, to yield a residue R2–3 and a filtrate F2–3. Residue R2–2 is washed for five minutes at 100° C. with filtrate F1–5, the "medium wash liquor," from Cycle 1, and filtered at filter 2–13 to yield a residue R2–4 and a filtrate F2–4, designated as the "strong wash liquor" from Cycle 2. Residue R2–4 is washed for five minutes at 100° C. with filtrate F1–6, the "weak wash liquor" from Cycle 1, and filtered at filter 2–14 to yield a residue R2–5 and a filtrate F2–5 which latter is designated the "medium wash liquor" from Cycle 2. Residue R2–5 is washed with boiling water in an amount 5.9 times the weight of the dry bark fed to cell 2–A for five minutes and filtered at filter 2–15 to yield a residue R2–6 and a filtrate F2–6 which latter is designated the "weak wash liquor" from Cycle 2.

The process is continued, extracting fresh bark in the A cells with the B cell extract of the previous cycle and extracting the washed residue from the A cell of a previous cycle in the B cell of the instant cycle with the "strong wash liquor" from the previous cycle, the residues from the B cell extractions being washed with filtrates from the previous cycle and finally with water.

After a number of cycles have been completed in accordance with this form of operation, the various solutions become constant from cycle to cycle, and, thus, after 3 such cycles it is found under the conditions of caustic usage, bark consistency, temperature, and extraction time described for the various steps of the operation, the various filtrates have the following composition:

| Filtrate Designation | Percent Total Solids | Percent Organic Solids |
|---|---|---|
| Final Product (Filtrate FN–1) | 13.9 | 11.3 |
| Extractant for Cell N–A (Filtrate FN–3) | 17.4 | 12.8 |
| Wash for Cell N–A residue (Filtrate FN–2) | 16.8 | 11.5 |
| Strong Wash Solution (Filtrate FN–4) | 8.2 | 5.4 |
| Medium Wash Solution (Filtrate FN–5) | 2.9 | 2.0 |
| Weak Wash Solution (Filtrate FN–6) | 0.9 | 0.6 |

The filtrate FN–1 collected for a final extract product is acidified to pH 1.5 by addition of sulfuric acid and the acidified mixture is heated to 90° C. to coagulate the precipitate formed. This mixture is then filtered and the residue washed thoroughly and analyzed for organic content. It is found that the organic acid insolubles represent 78.8% of the organic material in the extract. The final residue RN–6 consisted of needle-shaped bark fibers equivalent to 35% of the dry weight of the original bark.

Having now described our invention and its preferred embodiments, what we desire to claim as new is:

1. The process of extracting chemical products from the bark of trees which comprises treating comminuted bark with an aqueous solution of an alkaline reacting substance selected from the group consisting of sodium hydroxide and potassium hydroxide, using from 10–20% of the alkaline reacting substance, based upon the dry weight of the bark, at a consistency of the bark of 10–25% and a temperature of about 100° C. for a period of from 15–180 minutes, separating the phases to yield a solid residue and an extraction solution, treating the said extraction solution with an acid reacting substance in sufficient quantity to produce a pH of from 1.5 to 5.5 whereby to yield a precipitate comprising phenolic substances and wax-like substances, and separating the precipitate from the solution.

2. The process of claim 1 in which the material extracted is comminuted Douglas fir bark.

3. The process of claim 1 in which the material extracted is a comminuted mechanically separated fraction of Douglas fir bark.

4. The process of claim 1 in which the extracting medium is an aqueous sodium hydroxide solution.

5. The process of claim 1 in which the acid reacting substance is a strong mineral acid.

6. The process of claim 5 in which the strong mineral acid is sulfuric acid.

7. The process of claim 5 in which the strong mineral acid is hydrochloric acid.

8. The process of claim 1 in which the acid reacting substance is acetic acid.

9. The process of claim 1 in which the acid reacting substance is sulfur dioxide.

10. The process of claim 1 in which the aqueous alkaline extraction of the bark is effected continuously and the flow of the bark to be extracted is countercurrent to the flow of the alkaline extracting agent.

References Cited in the file of this patent
UNITED STATES PATENTS

| | | |
|---|---|---|
| 2,676,980 | Tu | Apr. 27, 1954 |
| 2,781,336 | Zenczak | Feb. 12, 1957 |